No. 798,463. PATENTED AUG. 29, 1905.
J. T. SMITH.
THRESHING AND FLAX RECLEANING MACHINE.
APPLICATION FILED NOV. 25, 1902.
2 SHEETS—SHEET 1.
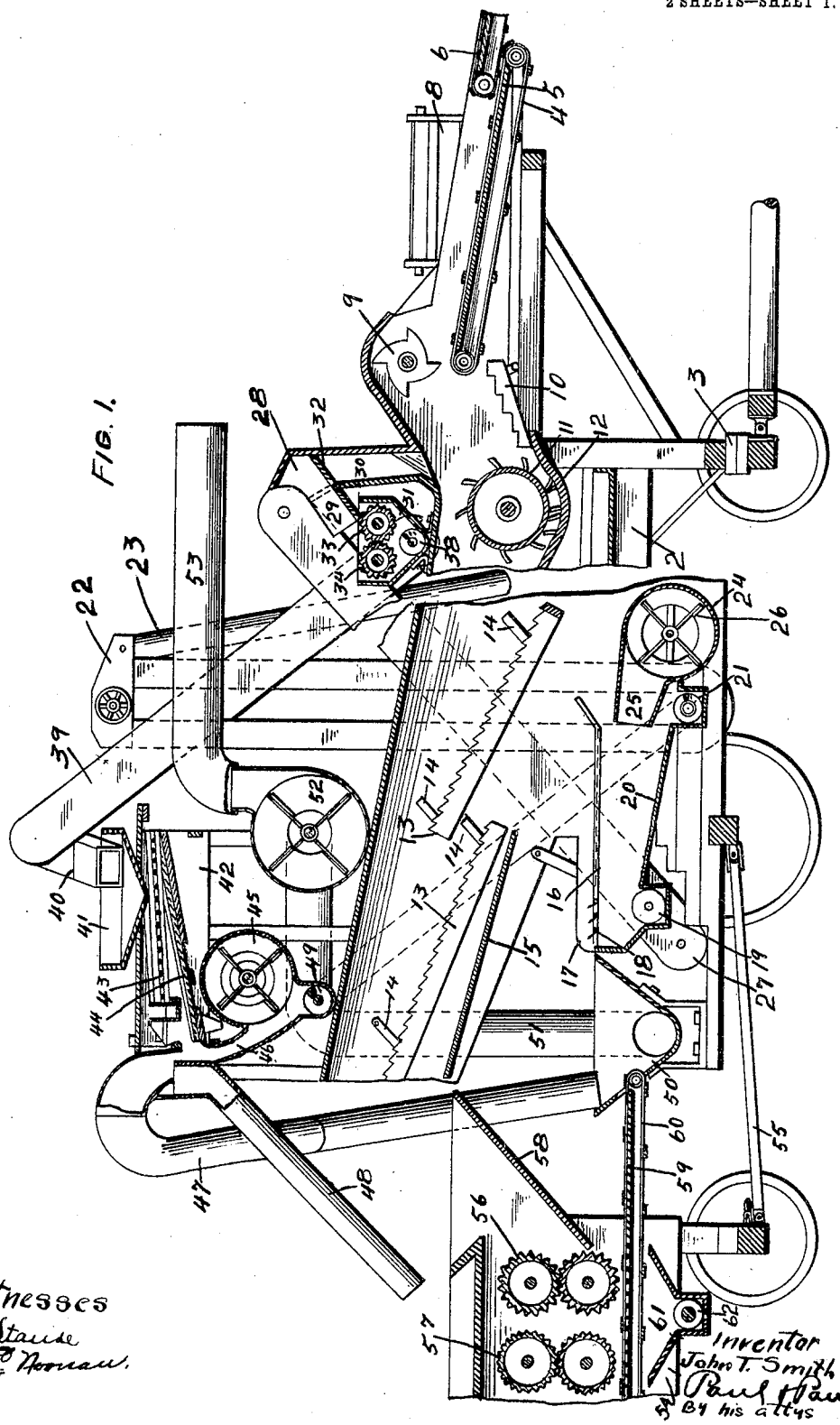
Witnesses
E. G. Stause
M. C. Noonan
Inventor
John T. Smith
By his attys
Paul Paul

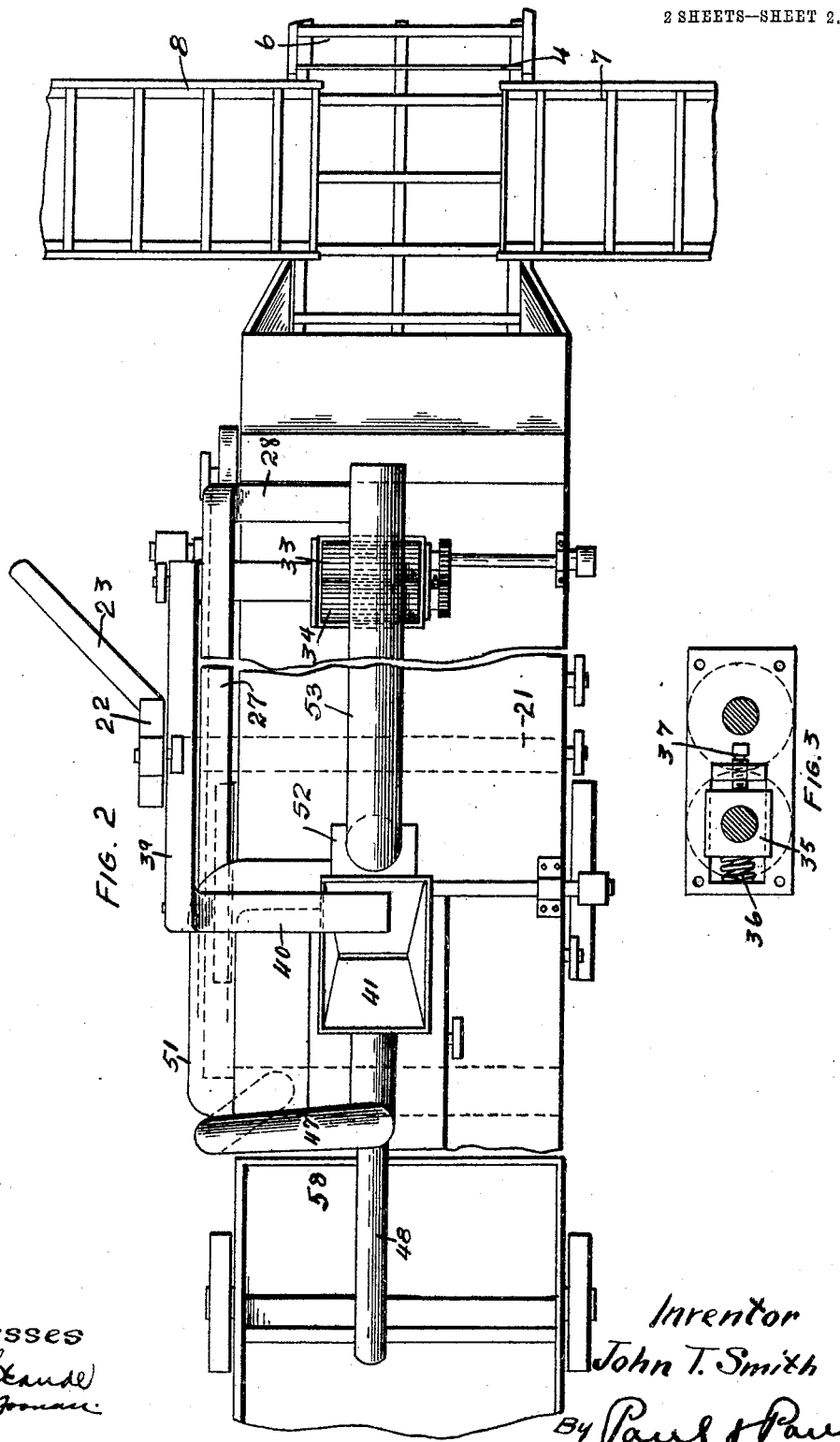

UNITED STATES PATENT OFFICE.

JOHN T. SMITH, OF HERON LAKE, MINNESOTA.

THRESHING AND FLAX-RECLEANING MACHINE.

No. 798,463.     Specification of Letters Patent.     Patented Aug. 29, 1905.

Application filed November 25, 1902. Serial No. 132,714.

*To all whom it may concern:*

Be it known that I, JOHN T. SMITH, of Heron Lake, county of Jackson, State of Minnesota, have invented certain new and useful Improvements in Threshing and Flax-Recleaning Machines, of which the following is a specification.

In threshing flax, as well as other grains, it is desirable to save as much of the seed as possible and at the same time operate the machine at its full capacity. I have found, particularly where the straw is very heavy, owing, perhaps, to a wet season or the character of the soil, that it is necessary to deliver it to a repeat mechanism to be passed through the cylinder and over the sieves a second time in order that a comparatively perfect separation of the seeds and refuse material may be effected, and when this is done the mingling of the repeat material with the straw passing through the cylinder for the first time makes such a volume on the sieves that it renders a very strong blast of air necessary to prevent their choking. The use of an extremely strong blast of air is, however, objectionable, as it blows away a considerable quantity of seed that would be saved could the sieves be kept clear in any other way.

The object, therefore, of my invention is to provide means, in connection with the repeat mechanism, for relieving the sieves of the volume of repeat material whenever it is found that too large a percentage of the seed is being carried away with the chaff and other refuse material.

A further object is to provide means for crushing any unbroken bolls that may be mixed with the repeat material, and a still further object is to provide means which will enable the operator to easily and quickly divert the repeat material from the threshing-cylinder and sieves when there is danger of choking or clogging and as readily direct it back into them again when the sieves are clear.

Other objects of the invention will appear from the following detailed description.

The invention consists generally in various constructions and combinations, all as hereinafter described, and particularly pointed out in the claims.

In the accompanying drawings, forming part of this specification, Figure 1 is a longitudinal vertical section of a threshing and recleaning machine embodying my invention. Fig. 2 is a plan view of the same. Fig. 3 is a detail showing the means for separating the boll-crushing rolls.

In the drawings, 2 represents a suitable casing mounted upon a wheeled frame 3 and wherein the threshing and recleaning mechanism is arranged.

4 represents the usual slatted bundle-carrier operating over a floor 5, and 6 a similar carrier that forms an extension of the bundle-carrier and substantially in line therewith.

7 and 8 are side carriers arranged to receive the bundles of grain from the wagons or stack and deliver them to the carrier 4.

The machine is of the portable type and may be drawn around the field or may be located near a stack, or the grain may be hauled to it on wagons.

9 is a band-cutter of the ordinary type, located over the discharge end of the bundle-carrier 4.

10 is a seed-pan, and 11 and 12 a cylinder and concave of the usual construction.

For convenience of illustration the middle portion of the machine is broken away, as shown, so that only a part of the cleaning mechanism that is common to machines of this character appears on the drawings. The mechanism is, however, sufficiently illustrated to show the position of the parts that are old and their functions and relations with respect to the novel features of the machine.

13 represents the straw-rack pivotally supported on links 14, 15 an inclined plate whereon the seeds and fine material fall from the rack, and 16 a sieve mounted in a shoe 17 beneath the discharge end of the plate 15. This sieve is of the usual construction, provided near its rear end with a series of rods 18, between which the coarse material and unbroken bolls fall into a transverse conveyer 19, while the seeds that have passed through the sieves before reaching the rods drop upon an inclined plate 20 and are discharged into a transverse conveyer 21. The conveyer 21 discharges into an elevator and weighing attachment 22 of the usual construction, and hence not shown in detail herein, that is provided with the usual discharge-spout 23.

Near the forward end of the sieve 16 is a fan-casing 24, having its discharge-opening 25 between the sieve 16 and the plate 20 in position to direct a strong current of air under and through the sieves and through the fan 26, located within said casing.

All this apparatus above described is common to threshing-machines in general use, and I make no claim to the same herein.

27 is a repeat-elevator connected with the discharge end of the conveyer 19 and running at an incline on the side of the machine to a point above and near the threshing-cylinder, where it is provided with a trunk 28, that communicates with branch spouts 29 and 30, the former leading to a hopper 31 and the latter to the space in front of the threshing-cylinder. A hinged valve 32 is provided at the junction of the spouts 29 and 30, by means of which the operator can direct the repeat material through to the threshing-cylinder or to the hopper 31, as desired. In the upper part of the hopper 31 I prefer to provide corrugated crushing-rolls 33 and 34, one of said rolls having adjustable bearing-blocks 35, that are normally held toward the other roll by springs 36, but may be readily adjusted by means of the set-screws 37, operating against the tension of said springs to separate the contacting surfaces of the rolls and allow the repeat material to fall between them without being engaged thereby. In the bottom of the hopper 31 is a transverse conveyer 38, having its discharge end connected with an elevator 39, that is provided at its upper end with a spout 40, arranged to deliver the material to a hopper 41. This hopper 41 forms part of a recleaning mechanism that is located in the upper part or on the top of the casing and consists of a suitable frame 42; sieves 43, arranged therein; an inclined floor 44, whereon the seeds are discharged from said sieve, and a blast-fan 45, that communicates with a trunk 46, leading into the space above the plate 44 and communicating with a discharge-spout 47. A swinging spout 48 is also provided opposite the end of said seed-plate. As the material passes through the sieve and over the discharge end of the seed-plate it is caught up by the air-blast, the heavier seeds falling into the transverse conveyer 49 below the fan, the lighter seeds—such as buckwheat, pigeon-grass, and other like seeds that are usually mixed with the refuse—passing into the spout 48, while the chaff and heavy material are carried along by the air-blast into the refuse-discharge spout 47. The spout 48 is arranged to deliver the material falling therein to the wagon or other receptacle at the side of the machine, while the spout 47 extends down to discharge its contents into a hopper 50, that is located near the rear end of the sieve 16 to receive the chaff and fine material therefrom. A spout 51 communicates with the hopper 50 through the wall thereof and extends to a suction-fan 52, arranged, preferably, on the casing near the recleaning mechanism and communicating with a discharge-spout 53.

I prefer to provide a flax-breaking machine consisting of a suitable wheeled frame 54 near the rear of the threshing and recleaning machine and connected thereto by the tongue 55 and having a series of crushing-rolls 56 and 57 arranged in pairs to receive the straw from a feed-board 58, whose receiving end is beneath the discharge end of the straw-rack 13. A perforated floor 59 is provided beneath the crushing-rolls, over which a slatted belt 60 operates to sweep the chaff and coarse material that collects on the floor, falling from the crushing-rolls, and discharge the same into the hopper 50 through an opening in the wall thereof. A hopper 61 is provided beneath the perforated portion of the floor to receive the seeds therefrom, and in the bottom of the hopper is a transverse seed-conveyer 62.

The operation of my improved threshing and flax-recleaning machine is as follows: The bundles of flax or other grain having been delivered to the threshing-cylinder, the straw will be carried forward on the straw-rack and delivered to the crushing-rolls, while the seeds, chaff, and fine refuse material will fall down through the straw-rack upon the sieve 16 and a considerable portion of the seed will be separated from the refuse. If the straw is running light and the machine is not driven to its full capacity, the sieve can probably be kept clear with a blast of air of ordinary strength, and the fine material from the sieve, with the unbroken bolls mixed therewith, can be delivered to the repeat mechanism with safety, conducted thereby back to the threshing-cylinder and run through the cylinder and over the straw-rack a second time without danger of clogging the sieve. In case, however, the straw is very heavy and rank and it is desirable to run the machine at its fullest capacity it will be impossible to utilize the repeat apparatus to take the chaff and unbroken bolls back to the cylinder to be run over the rack and through the sieve a second time without greatly increasing the strength of the air-blast in order to prevent the sieve from clogging. As soon, however, as the strength of the air-blast is increased a considerable quantity of the seeds will be blown off the sieve with the chaff and lost. When the operator discovers that the seed is being wasted, he will adjust the valve 32 to divert the repeat material away from the threshing-cylinder and discharge it into the hopper 31 upon the rolls therein. These rolls will crush and break open the bolls and loosen the seed, which, with the chaff and other fine material, will be carried up to the hopper 43 and from thence into the recleaning mechanism. While passing through this mechanism the seed will be separated from the chaff and other refuse and discharged at the side of the machine, while the waste material will pass down through the spout 47 into the hopper 50 and will there mingle with the chaff and refuse from the sieve 16 and from the floor beneath the crushing-rolls 56 and 57. The operation of the suction-fan 52 will keep the hopper clear, conducting the chaff and other refuse material therein through the pipes 51 and 53 to a point a suitable distance from the machine. In case there are no unbroken seed-bolls in the repeat material the boll-crushers may be separated in the manner described to allow the material to drop between them into the transverse conveyer 38. In this way a practically perfect separation of the seed and the refuse material can be effected with the machine running at its highest capacity, which is not possible in the operation of any other apparatus heretofore designed for this purpose.

I claim as my invention—

1. The combination, with a threshing-cylinder and straw-rack, of a sieve provided beneath said rack, a blast-fan arranged to direct a current of air under and through said sieve, a repeat-elevator mechanism arranged to receive the coarse material and unbroken seed-bolls from said sieve, a hopper near the discharge end of said repeat-elevator, a recleaning apparatus connected with said hopper, spouts communicating with the discharge end of said repeat-elevator and leading to said hopper and to the space in front of said cylinder, and a valve provided in said spouts.

2. The combination, with a threshing-cylinder and straw-rack, of a sieve provided beneath said rack, a blast-fan arranged to direct a current of air under and through said sieve, an elevator whereto the unbroken bolls and coarser material from said sieve are delivered, a hopper provided near the discharge end of said repeat-elevator, boll-crushing rolls provided in said hopper, a recleaning apparatus connected with said hopper, spouts connected with the discharge end of said elevator and leading respectively to said hopper and to the space in front of said cylinder, and a valve provided in said spouts.

3. The combination, with a threshing-cylinder and straw-rack, of a sieve provided beneath said rack, a blast-fan, a transverse conveyer provided beneath said sieve and whereto the unbroken bolls and coarse material are delivered, a repeat-elevator connected with the discharge end of said conveyer, a hopper near the discharge end of said elevator, a trunk 28 communicating with said discharge end, spouts 29 and 30 branching from said trunk and leading to said hopper and to the space in front of said cylinder respectively, a hinged valve provided at the junction of said spouts, a transverse conveyer in the bottom of said hopper, an elevator connected therewith, and a recleaning apparatus whereto the material discharged into said hopper is delivered.

4. The combination, with the threshing-cylinder and straw-rack, of a sieve provided beneath said rack, a blast-fan, a repeat-elevator arranged to receive the unbroken seed-bolls and chaff from said sieve, a recleaning apparatus, suitable connections provided between said recleaning apparatus and the discharge end of said repeat-elevator, a hopper near the discharge end of said sieve, a spout leading from said recleaning apparatus to said hopper, a second spout connected with said hopper, and a suction-fan provided in said second spout.

5. In a flax threshing and recleaning machine, the combination, with a threshing-cylinder and straw-rack, of a sieve located beneath said rack, a blast-fan beneath the forward end of said sieve, a repeat-elevator arranged to receive the chaff and unbroken seed-bolls from the discharge end of said sieve, a hopper arranged above and near said cylinder, a trunk connected with the discharge end of said repeat-elevator and having spouts leading respectively to said hopper and said cylinder, a valve provided in said trunk, crushing-rolls arranged in said hopper, a recleaning apparatus mounted on said machine-frame and an elevating device connecting said hopper and said recleaning apparatus.

6. In a flax threshing and recleaning machine, the combination, with a threshing-cylinder and straw-rack, of a sieve beneath said rack, a blast-fan near one end of said sieve, a repeat-elevator arranged to receive the chaff and unbroken seed-bolls from the discharge end of said sieve, a spout communicating with the discharge end of said repeat-elevator and having a branch spout leading to said cylinder, a recleaning apparatus, an elevating device communicating with said spout and leading to said recleaning apparatus, and a valve arranged to direct the material from said repeat-elevator to said cylinder or to said elevating device, substantially as described.

7. The combination, with a threshing-cylinder and straw-rack, of a sieve beneath said rack, a blast-fan arranged to direct a current of air under and through said sieve, a repeat-elevator arranged to receive the coarse material and unbroken seed-bolls from said sieve, a hopper provided with crushing-rolls and arranged near the discharge end of said repeat-elevator, a recleaning apparatus connected with said hopper, spouts communicating with the discharge end of said repeat-elevator and leading to said hopper and to the space in front of said cylinder, and a valve arranged to direct the material to said cylinder or to said hopper.

In witness whereof I have hereunto set my hand this 19th day of November, 1902.

JOHN T. SMITH.

In presence of—
RICHARD PAUL,
M. C. NOONAN.